No. 820,038. PATENTED MAY 8, 1906.
J. S. COPELAND.
DRIVING MECHANISM FOR BICYCLES, &c.
APPLICATION FILED JULY 5, 1904.
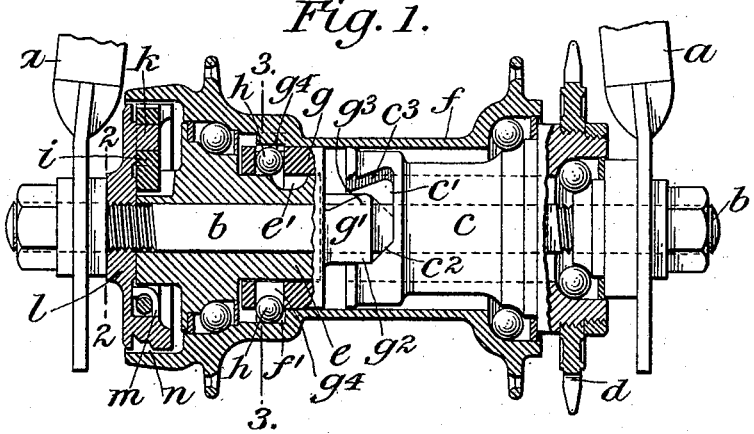
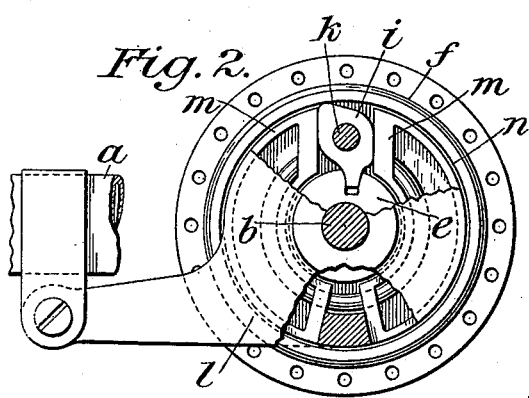
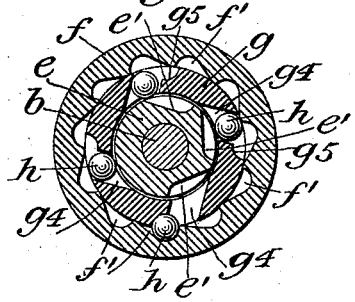
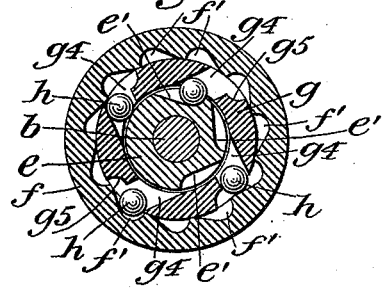

UNITED STATES PATENT OFFICE.

JAMES S. COPELAND, OF HARTFORD, CONNECTICUT, ASSIGNOR TO POPE MANUFACTURING COMPANY, OF JERSEY CITY, NEW JERSEY, AND HARTFORD, CONNECTICUT, A CORPORATION OF NEW JERSEY.

DRIVING MECHANISM FOR BICYCLES, &c.

No. 820,038.      Specification of Letters Patent.      Patented May 8, 1906.

Application filed July 5, 1904. Serial No. 215,281.

*To all whom it may concern:*

Be it known that I, JAMES S. COPELAND, a citizen of the United States, residing in Hartford, in the county of Hartford, in the State of Connecticut, have invented certain new and useful Improvements in Driving-Mechanism for Bicycles, &c., of which the following is a specification, reference being had to the accompanying drawings, forming a part hereof.

As ordinarily constructed coaster-brakes for bicycles, &c., prevent the wheel to which they are applied from being rotated backward. In the ordinary use of bicycles this is not a serious objection; but when a bicycle has been placed in a rack and is to be withdrawn it is not always convenient to lift the rear wheel from the floor in order to permit the bicycle to be withdrawn, and if this is not done the bicycle must be drawn out with the tire of the rear wheel dragging on the floor. At such times, therefore, the inability of the rear wheel to turn freely is a serious objection.

It is one purpose of this invention to so construct and arrange the bearings, driving mechanism, and breaking mechanism of a coaster-brake for bicycles, &c., as to permit the wheel to which it is applied to be rotated backward freely when necessary without in any manner interfering with the proper operation of the driving and braking mechanism and without materially increasing the cost of construction.

In accordance with the invention as embodied in a coaster-brake for bicycles the driving and braking mechanism of the driving-wheel is constructed in such a manner that the backward movement of the driving-gear, which applies the brake when the bicycle is running in a forward direction, also disengages the wheel-hub from the driving mechanism so that the former may rotate freely in a backward direction with respect to the driving mechanism.

The invention will be more fully described hereinafter with reference to the accompanying drawings, in which for the purpose of enabling the nature of the invention to be more clearly understood it is illustrated as embodied in a convenient and practical form.

In the drawings, Figure 1 is a view, partly in longitudinal vertical central section and partly in elevation, of the rear or driving-wheel hub of a bicycle to which the present invention is applied, portions of the frame of the bicycle being also shown in plan. Fig. 2 is a view of the same partly in end elevation and partly in transverse section on the plane indicated by the line 2 2 of Fig. 1. Fig. 3 is a view in transverse section on the plane indicated by the line 3 3 of Fig. 1, showing the wheel-hub engaged with the driving-hub; and Fig. 4 is a view similar to Fig. 3, but showing the driving-hub engaged with the brake-actuator.

In the embodiment of the invention which has been chosen for illustration in the drawings the rear fork members $a\ a$ of a bicycle-frame of ordinary construction are shown as supporting in usual manner a rear wheel-shaft $b$, upon which is mounted in any suitable manner a driving-hub $c$, which may receive the driving-gear $d$ and a brake-actuator or second hub $e$. The rear-wheel hub $f$, also of usual construction, is mounted for rotation upon the driving-hub $c$ and the brake-actuator $e$, suitable ball-bearings being provided, as indicated in Fig. 1 of the drawings. Between the driving-hub $c$ and the brake-actuator $e$ and within the hub $f$ is mounted a longitudinally-movable sleeve or free-moving pawl-carrier $g$, which is adapted to be moved longitudinally in one direction or another by a partial forward rotation of the driving-hub $c$ or by a partial backward rotation of the same as occasion may require. To effect the longitudinal movement of the sleeve $g$, the end of the driving-hub $c$ is cut out, as at $c'$, to form at one end of the cut an inclined cam-surface $c^2$ and at the other end of the cut an overhanging cam-surface $c^3$. The sleeve $g$ is provided at its end with a tongue $g'$, the heel of which, as at $g^2$, is arranged to coöperate with the inclined cam-surface $c^2$ on the driving-hub $c$, while the point $g^3$ overhangs and is arranged to coöperate with the undercut cam-surface $c^3$ of the driving-hub $c$. In the positions of the several parts represented in Fig. 1 of the drawings the sleeve $g$ is shown in its left-hand position, to which it is moved by the action of the inclined cam-surface $c^2$ during a relative forward movement of the driving-hub $c$. The cut-out $c'$ is somewhat larger than the tongue $g'$, as clearly indicated in Fig. 1, and a partial backward rotation of the driving-hub $c'$ through the coöperation of the undercut cam-surface $c^3$ with the toe $g^3$, will cause a longitudinal movement of the sleeve $g$ in the opposite direction.

As already indicated, the longitudinally-movable sleeve $g$ is a carrier for free-moving pawls, preferably balls, being provided with a series of pockets $g^4$, which open through the sleeve exteriorly and interiorly, such pockets being preferably inclined with respect to the radii of the sleeve and being provided at the outer end thereof with a driving-abutment $g^5$. As clearly represented in Fig. 1, the sleeve $g$ is arranged to slide upon a portion of the brake-actuator $e$ of reduced diameter, so that the free-moving pawls or balls $h$, which are placed in the pockets $g^4$, may be moved into line with the driving-pockets $f'$, formed interiorly in the hub $f$, or with braking-pockets $e'$, formed exteriorly in the reduced portion of the brake actuator or hub $e$.

It will now be understood that when the driving-gear $d$ is rotated in a forward direction the sleeve or ball-carrier $g$ is first shifted longitudinally into the left-hand position, so that the balls $h$, which are carried thereby, shall engage the pockets $f'$ in the wheel-hub $f$, such balls dropping at the lowest point in their movement partly into the pockets $f'$ to be engaged between the shoulders at the ends of such pockets and the seats or abutments $g^5$ of the sleeve-carrier. In this manner the driving-wheel, the hub of which is shown at $f$, will be rotated in a forward direction. On the other hand, if a partial backward rotation be imparted to the driving-gear $d$ by back-pedaling, the sleeve $g$ will be drawn to the right in Fig. 1, and the balls $h$, carried thereby, will be brought into line with the pockets $e'$ in the brake-actuator $e$. At the highest point in their movement such balls will therefore be engaged between the abutment formed at the end of each pocket $e'$ and the opposing wall of the pocket $g^4$, whereby a partial backward rotation will be imparted to the brake-actuator $e$. As usual in coaster-brakes of the character represented in the drawings, the partial backward rotation which is thus imparted to the brake-actuator $e$, through the engagement thereof with the brake-actuating lever $i$, as shown in Fig. 2, which is pivoted upon a stud $k$, carried by a fixed cap $l$, causes the segmental anchored brake-ring $m$ to be expanded against the internal brake-surface $n$ on the wheel-hub $f$, checking the rotation of the wheel.

It will be obvious that any suitable form of brake mechanism may be employed in connection with the devices which particularly embody the invention and also that various changes may be made in the details of construction and arrangement of such devices—as, for example, the substitution of some other form of clutch for the ball-clutch between the driving hub or member $c$ on the one hand and the wheel-hub and the brake-actuator on the other and that the devices are capable of application to driving mechanism other than coaster-brakes without departing from the spirit of the invention.

I claim as my invention—

1. The combination of a driven member provided with pockets for free-moving pawls, a driving member, a pawl-carrying clutch member rotatable with the driving member and movable to shift its pawls into and out of line with the pawl-pockets of the driven member to drive the same and to permit its free rotation and means operated by the relative rotation of the driving member and the clutch member to move said clutch member, substantially as described.

2. The combination of a driven member provided with pockets for free-moving pawls, a driving member, a pawl-carrying clutch-sleeve rotatable with the driving member and movable longitudinally to shift its pawls into and out of line with the pawl-pockets of the driven member to drive the same and to permit its free rotation and means operated by the relative rotation of the driving member and the clutch member to move said sleeve, substantially as described.

3. The combination of a driven member, a driving member and a clutch-sleeve, said driving member and said clutch-sleeve having a cam-and-toe engagement whereby said sleeve is moved longitudinally upon relative rotation of said driving member, and said sleeve having pawl-pockets carrying free-moving pawls for engagement with pockets in the driven member, substantially as described.

4. The combination of a driven member, a sleeve-like driving member, a rotary oscillating brake-actuator, a brake-lever engaged thereby, brake mechanism operated by said lever, a sleeve-like clutch member of the same diameter as the driving member and having endwise engagement therewith and moving longitudinally toward and from the driving member in endwise relation therewith, and means to effect operative engagement and disengagement of said clutch member with and from said driven member and said brake-actuator, substantially as described.

5. The combination of a driven member, a sleeve-like driving member, a rotary oscillating brake-clutch, a brake-lever engaged thereby, a brake mechanism operated by said lever, a sleeve-like clutch member of the same diameter as the driving member and having endwise engagement therewith and moving longitudinally toward and from the driving member in endwise relation therewith, and means operated by the relative rotation of the driving member and the clutch member to move said clutch member into and out of engagement with and from said driven member and said brake-actuator, substantially as described.

6. The combination of a driven member, a driving member, a rotary oscillating brake-actuator provided with pawl-pockets, a pawl-carrying clutch member rotatable with the driving member, and means to move said clutch member longitudinally to shift its pawls into and out of line with the pawl-pockets of the brake-actuator, substantially as described.

7. The combination of a driven member, a driving member, a rotary oscillating brake-actuator provided with pawl-pockets, a pawl-carrying clutch member rotatable with the driving members, and means operated by the relative rotation of the driving member and the clutch member to move said clutch member longitudinally to shift its pawls into and out of line with the pawl-pockets of the brake-actuator, substantially as described.

8. The combination with a driven member provided with pawl-pockets, a driving member, a brake-actuator provided with pawl-pockets, a pawl-carrying clutch member and means to move the clutch member longitudinally to shift its pawls into and out of line with the pawl-pockets of the driven member and the pawl-pockets of the brake-actuator, substantially as described.

9. The combination of a driven member, a driving member, a brake-actuator, a clutch-pawl carrier rotatable with the driving member, said wheel-hub and said brake-actuator having pockets for engagement with the pawls, and means to shift its carrier longitudinally to effect engagement and disengagement of said pawls with and from said driven member and said brake-actuator, substantially as described.

10. The combination of a driven member, a driving member, a brake-actuator and a longitudinally-movable pawl-carrying sleeve having a loose cam engagement with said driving member, said driven member and said brake-actuator having pockets for engagement respectively with the pawls of said pawl-carrying sleeve, substantially as described.

11. The combination of a driven member, a driving member and a clutch-sleeve, said driving member and said clutch-sleeve having operative engagement whereby said sleeve is moved longitudinally upon relative rotation of said driving member, and said sleeve having pawl-pockets carrying free-moving pawls for engagement with pockets in the driven member, substantially as described.

This specification signed and witnessed this 30th day of June, A. D. 1904.

JAMES S. COPELAND.

In presence of—
E. E. SEGAR,
L. A. McKAY.